United States Patent [19]

Adams et al.

[11] 3,823,262

[45] July 9, 1974

[54] FACSIMILE RECORDER WITH COMPENSATION OF THE ELECTROSENSITIVE BLANK NONLINEAR APPLIED VOLTAGE-BURN CHARACTERISTIC

[75] Inventors: Max S. Adams, Long Beach; Gunther Wicher, Stanton, both of Calif.

[73] Assignee: Coloroptics, Inc., Stanton, Calif.

[22] Filed: Oct. 24, 1972

[21] Appl. No.: 299,872

[52] U.S. Cl. ........ 178/6.6 R, 178/6.6 B, 178/6.7 R, 346/74 SB, 346/74 E

[51] Int. Cl. ........................ H04n 1/22, G01d 15/06

[58] Field of Search ........... 178/6.6 R, 6.6 B, 6.7 R; 346/74 SB, 74 R, 74 E, 74 P

[56] References Cited

UNITED STATES PATENTS 2,892,887 6/1954 Nell ................................ 178/6.6 B
3,325,818 6/1967 Nakagawa ........................ 346/74 E
3,613,103 10/1971 Harris ............................ 178/6.6 R

*Primary Examiner*—Raymond F. Cardillo, Jr.
*Attorney, Agent, or Firm*—Harris, Kern, Wallen & Tinsley

[57] ABSTRACT

A facsimile recorder including a control circuit for amplitude modulating a train of pulses with a voltage signal generated by a photoscanner as it scans an image on a reference document, the control circuit including circuitry for modifying the amplitude of the voltage signal with changes in the intensity of light reflected from the image to compensate for a nonlinear applied voltage-burn characteristic of an electrosensitive blank to which the amplitude modulated pulse train is applied to produce a facsimile of the image.

2 Claims, 6 Drawing Figures

PATENTED JUL 9 1974

3,823,262

FACSIMILE RECORDER WITH COMPENSATION OF THE ELECTROSENSITIVE BLANK NONLINEAR APPLIED VOLTAGE-BURN CHARACTERISTIC

The present invention relates to facsimile recorders and more particularly to a facsimile recorder including means for compensating for a nonlinear applied electrical signal-burn characteristic of an electrosensitive blank on which is formed a facsimile of an image on a reference document.

In printing and other duplicating fields, it is often necessary as an initial step to produce a facsimile of an original image. For example, such a facsimile image must be formed on a stencil material for mimeograph duplication and on a specifically coated paper for photographic screening in offset printing. Further, in the case of color originals, each color must be separated from all other colors and reproduced individually as separate facsimiles.

In the production of such facsimiles on stencils and on specially coated paper, recorders and reproducers including photoscanning means are commonly employed. In such recorders, the photoscanning means scans an image on a reference document and generates a voltage signal varying in amplitude with changes in the intensity of a light beam reflected from the image. The voltage signal is modulated by a high frequency signal, amplified, and applied by a stylus to an electrosensitive blank. The stylus scans the blank in synchronism with the photoscanning means and in response to the modulated signals burns closely spaced dots in an upper masking layer of the blank. The sizes of the dots vary with the amplitude of the modulated signals to produce on the blank a facsimile of the original image scanned by the photoscanning means.

Unfortunately, prior facsimile recorders suffer from numerous drawbacks, not the least of which is the unevenness of the shades of the generated facsimile relative to the shades of the original image. That is, the facsimile does not accurately match the original as to changes in shading of the original image. It has been found that one of the major causes for such shade irregularity is the nonlinear applied voltage dot-size burn characteristics of the electrosensitive blanks commonly employed in such recorders. Because of such characteristics, direct changes in the magnitude of the voltage signals produced by the photoscanning means in response to changes in the intensity of light reflected from the original image do not produce corresponding changes in the shading of the facsimile. This is particularly noticeable in the darker light regions where changes in shade are quite subtle. In fact, in many facsimile recorders all shades darker than a given shade in the original image appear in the facsimile as black or some other reference color.

In view of the foregoing, it is an object of the present invention to provide an improved facsimile recorder capable of producing facsimiles of an original image which closely follow the shading of the original image.

Another object of the present invention is to provide a facsimile recorder including means for compensating for the nonlinear applied voltage-burn characteristics of an electrosensitive blank employed in the facsimile recorder.

A further object of the present invention is to provide a facsimile recorder which is simple in construction long-lasting, and durable in operation, and which faithfully and rapidly produces facsimiles of original images.

The foregoing as well as other objects and advantages of the present invention may be made clearly understood by reference to the following detailed description when considered with the drawings which, by way of example only, illustrate one form of facsimile recorder embodying the features of the present invention.

Figures 5, 6:
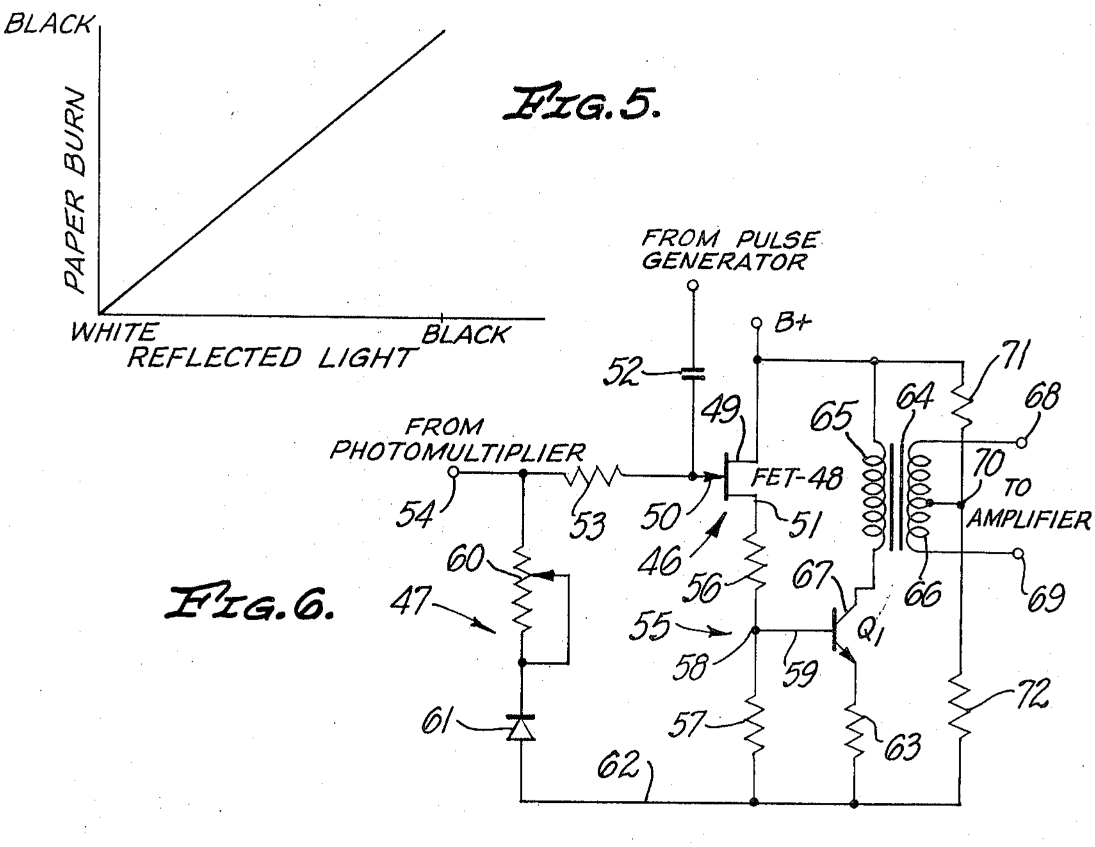

FIG. 5 is a curve representing the relationship between the light reflected from the image on the reference document and the burn characteristic of the electrosensitive blank denoting the linear relationship therebetween in the facsimile recorder of the present invention; and FIG. 6 is a schematic of the control means incorporated in the circuitry of the facsimile recorder to compensate for the nonlinear applied voltage-burn characteristic of the electrosensitive blank.

Generally speaking, the facsimile recorder of the present invention includes a photoscanner 10 for scanning an image 11 on a reference document 12 and for generating an electrical signal which varies with changes in the intensity of a light beam 13 relected from the document. The electrical signal is applied to a control circuit 14 (FIGS. 2 and 6) where it is modified in magnitude to compensate for the nonlinear applied voltage-burn characteristic of an electrosensitive blank 15 on which a facsimile image 16 is formed. In the control circuit, the modified electrical signal is also modulated with a train of electrical pulses and the resultant modulated pulse train applied to a stylus 17. The stylus 17 scans the blank 15 in synchronism with the photoscanner 10 and applies the modulated pulse train to an upper masking layer of the blank to burn dots therein of sizes varying with the amplitude of the applied electrical pulses. Since the electrical pulses applied by the stylus to the blank are modulated to compensate for the nonlinear applied voltage-burn characteristic of the blank 15, the dots burned in the blank vary in size linearily with the intensity of the light reflected from the document 12 to produce a true facsimile of the image 11.

Figure 1:
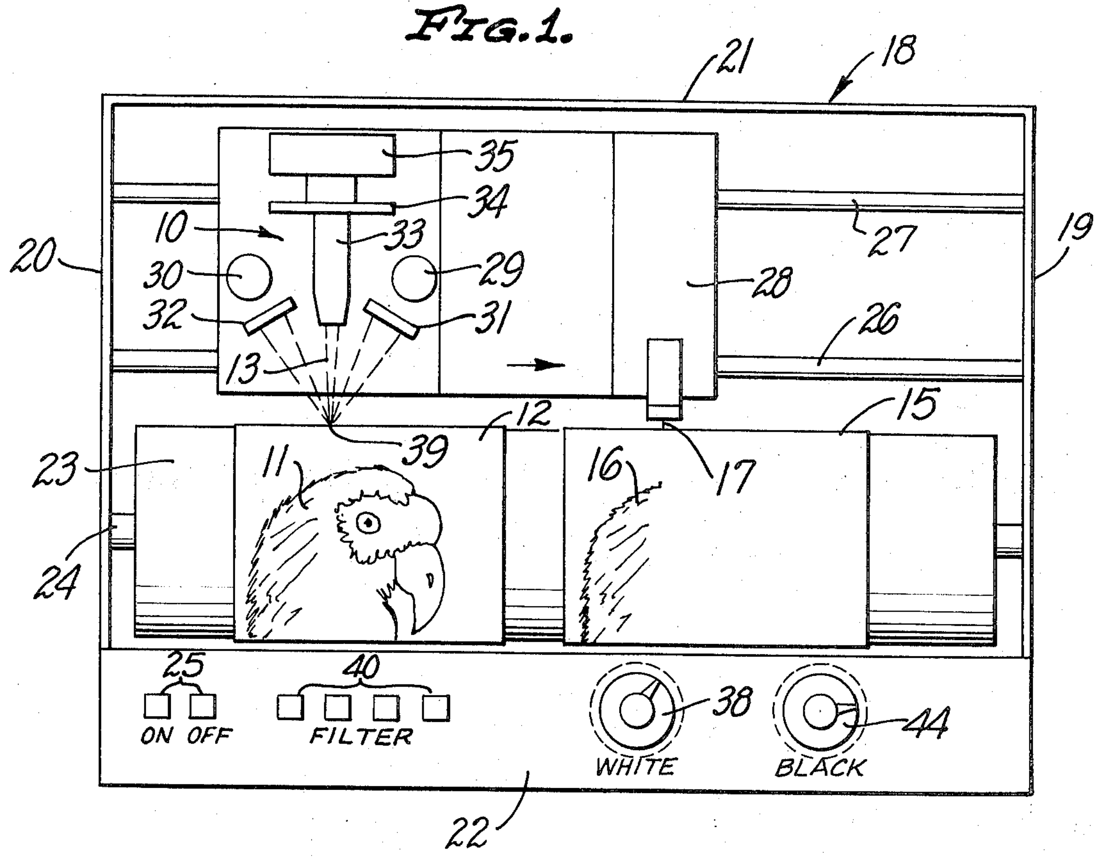
FIG. 1 is a top view of the facsimile recorder.
Figure 2:
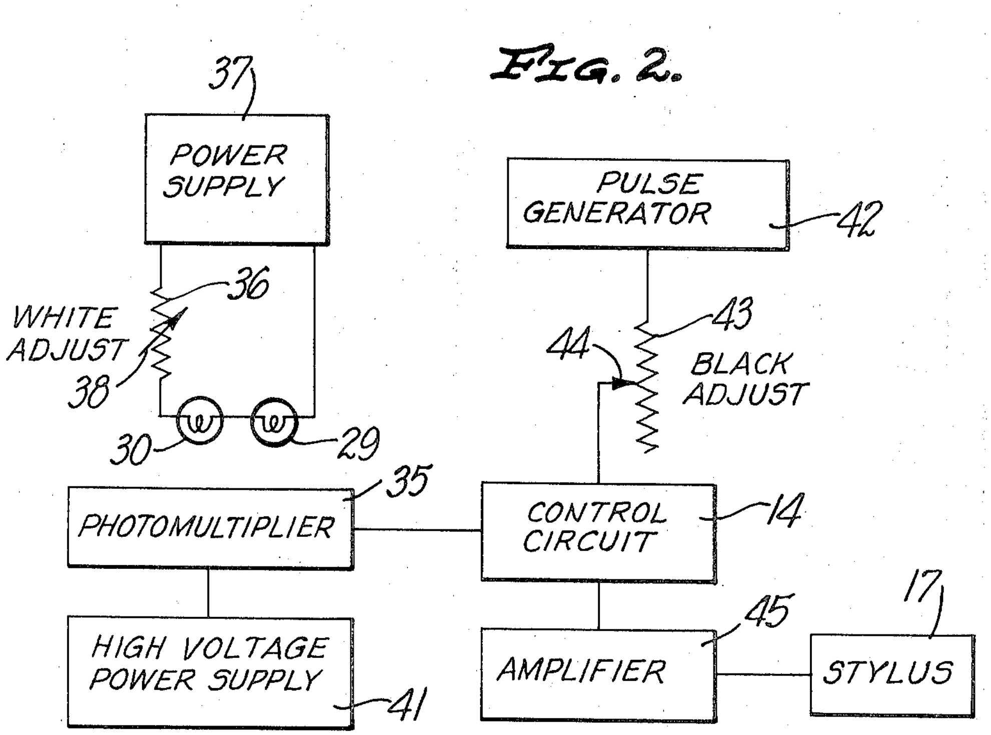
FIG. 2 is a block diagram of the circuitry associated with the facsimile recorder.

Considering now in more detail the form of the facsimile recorder shown in FIGS. 1 and 2, the facsimile recorder is contained and supported in a housing 18 having substantially vertical and parallel right and left side walls 19 and 20 and a back wall 21 opposite a front panel 22. The reference document 12 and the electrosensitive blank 15 are mounted side by side on a drum 23 carried on a shaft 24 having ends secured to the left and right side walls of the housing. The drum 23 is adapted for rotation on the shaft in response to operation of a motor drive (not shown) secured to a base of the housing and actuated by the on-off switch 25 on the front panel 22. In the form of the facsimile recorder illustrated in FIG. 1, the reference document carries the image of a parrot and it is desired to produce on the electrosensitive blank a true facsimile of the original image.

Also secured to and extending between the left and right side walls of the housing 18 are parallel guide rails 26 and 27 for a carriage 28. The carriage supports the photoscanner and the stylus for movement from left to right along the rails in response to operation of the motor drive. As the carriage 28 travels from left to right, the photoscanner 10 scans the rotating image on the reference document 12 in a closely spaced helix while the stylus 17 scans the electrosensitive blank 15 along a similar helical path and burns a series of dots of varying sizes to produce the facsimile image.

More particularly, the photoscanner 10 comprises a pair of lamps 29 and 30, a pair of light-focusing lenses 31 and 32, a light-collecting lens system 33, a filter unit 34, and a photomultiplier tube 35, all of conventional structure. The lamps 29 and 30 are electrically connected in series with a variable resistor 36 and a power supply 37. The variable resistor is labeled "White Adjust" and includes a control knob 38 on the front panel 22. A turning of the knob controls the value of the resistance in the series circuit and hence the brilliance of the light emanating from the lamps 29 and 30.

As illustrated most clearly in FIG. 1, the lamps 29 and 30 extend vertically from a top of the carriage 28 immediately adjacent the light-focusing lenses 31 and 32. The lenses are angled relative to each other to focus light emanating from the lamps at a common focal point 39 on the drum 23. Thus, as the drum rotates and the carriage travels, the photoscanner scans the image on the reference document along a closely spaced helical path. As the photoscanner thus scans the reference document, the light beam 13 is continuously reflected from the common focal point 39. The reflected light beam 13 varies in intensity with changes in the shade of the image on the reference document 12 — the whiter the shade the more intense the light beam and the darker the shade, the lower the intensity of the light beam. The light-collecting lens system 33 is located between the lenses 31 and 32 and is adapted to receive and concentrate the reflected light beam 13 through the filter unit 34 to the photomultiplier tube 34.

The filter unit 34 may comprise a series of laterally spaced filters each designed to pass light of a different color to the photomultiplier tube. For example, the filter unit may include separate filters for only passing red, yellow, blue, or green light to the photomultiplier tube. Such a filter unit may be actuated by depressing filter switches 40 on the front panel of the housing and may be particularly useful in producing separate facsimiles for different colors contained in an original image. Such separate facsimiles are highly useful in multicolor mimeograph and offset printing processes.

As shown in FIG. 2, the photomultiplier tube 35 is energized by a high voltage power supply 41. In response to the reflected light beam 13, the photomultiplier tube 35 generates a voltage signal having a magnitude proportional to the intensity of the reflected light beam. That is, the more brilliant the light, the greater the magnitude of the voltage signal generated by the photomultiplier tube. The less the intensity of the reflected light beam, the less the magnitude of the voltage generated by the photomultiplier tube. As previously mentioned, changes in the intensity of the reflected light beam are produced by changes in the shade of the image on the reference document. Accordingly, there is a direct relationship between the shade of the image on the reference document and the magnitude of the voltage signal generated by the photomultiplier tube.

As represented generally in FIG. 2, the voltage signal generated by the photomultiplier tube is applied to the control circuit 14. In the control circuit 14, the voltage signal is modified and modulated with a train of pulses. The pulses are generated by a pluse generator 42 and adjusted as to magnitude by a variable resistor or potentiometer 43 labeled "Black Adjust" and including a control knob 44 on the front panel 22 of the housing 18. The modulated pulse train at the output of the control circuit 14 is then amplified by an amplifier 45 and applied to the stylus 17. The stylus in turn applies the pulses to the electrosensitive blank 15 rotating on the drum 23 to burn a series of closely spaced dots through the upper masking layer of the blank, thereby producing a visual image comprising a facsimile of the original image on the reference document.

More particularly, the electrosensitive blank 15 may be a voltage sensitive paper, such as described in U.S. Pat. No. 2,887,632, or a voltage sensitive stencil, as described in U.S. Pat. No. 2,664,043. Such electrosensitive blanks include an upper masking layer over a contrasting conductive layer. After some experimentation, it has been found that such electrosensitive blanks possess a nonlinear applied voltage-burn characteristic which without compensation results in facsimile images that depart materially in shading from original images.

Figure 3:
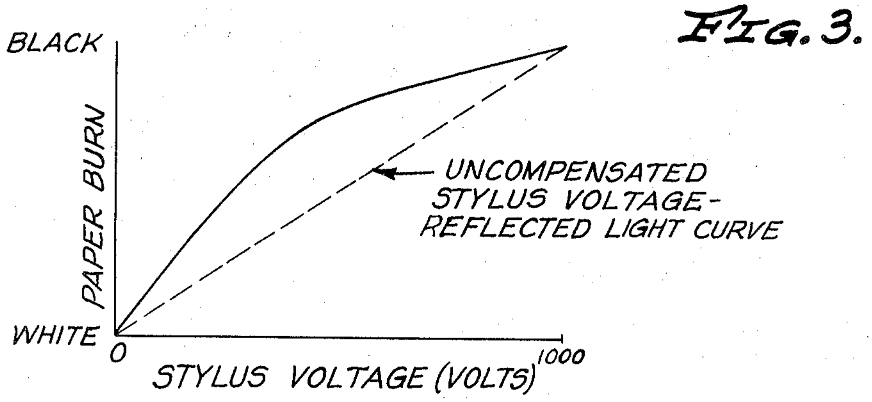
FIG. 3 is a curve illustrating the nonlinear applied voltage-burn characteristic of electrosensitive blank employed in the facsimile recorder.

The problems associated with such a nonlinear characteristic may be more clearly appreciated by referring to the curves set forth in FIG. 3. In FIG. 3, the dotted line represents an uncompensated voltage applied by a stylus to the upper masking layer of an electrosensitive blank. It is noted that the uncompensated voltage varies in a linear manner with the intensity of the light reflected from the original image. This means that as the shade of the image gradually changes from white to black, the magnitude of the stylus voltage changes from a first to a second magnitude in a linear manner, here from approximately zero to approximately 1,000 volts. For such a change in stylus voltage, the burn characteristic of the electrosensitive blank represented by the solid line is nonlinear. In particular, as the stylus voltage increases from zero to 1,000 volts, the paper burn increases at a very rapid rate and then at a slower rate. Thus, for a stylus voltage corresponding to a given shade at a particular area on an original image, a series of dots are burned through the upper masking layer of the electrosensitive blank having a size that when viewed appear as a shade substantially darker than the shade of the original image at the particular area.

Figure 4:
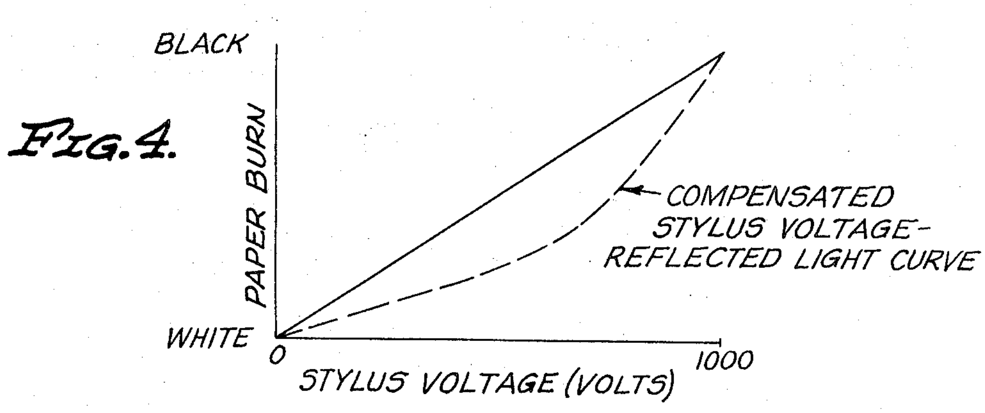
FIG. 4 is a curve representing the modified voltage produced in the facsimile recorder to compensate for the nonlinear applied voltage-burn characteristic of the electrosensitive blank employed in the facsimile recorder.

To correct for such a nonlinear relationship between stylus voltage and paper burn, and to produce a matching or linear relationship between the magnitude of reflected light from an original image and the shade resulting from the burning of a series of dots on an electrosensitive blank (see FIG. 5), the control circuit 14 includes means for modifying the voltage signal generated by the photomultiplier tube 35 such that the magnitude of the modified voltage varies with the intensity of the reflected light beam as an inverse of the nonlinear burn characteristic of the electrosensitive blank. Such compensation is then reflected in the amplitude modulated pulse train applied to the stylus 17 as depicted by the dotted line curve in FIG. 4. Note that the shape of the dotted line curve in FIG. 4 appears as a substantial inverse of the full line curve of FIG. 3. The result of the application of the modified voltage signal to the stylus is a linear burn characteristic as represented by the solid straight line in FIG. 4. Under such circumstances, the original image 11 having a particular shade in a given area reflects light of a particular intensity to the photomultiplier tube 35 to develop a voltage signal. The voltage signal is modified by the control circuit 14, modulated, and applied as a modified or compensated stylus voltage to the stylus 17 to burn a series of closely spaced dots on the electrosensitive blank 15 having a size which when viewed appears as a shade corresponding to the shade of the original image in the given area. A similar relationship applies over the full range of intensities of light or shades on the original image even in the darker regions where shade changes are very subtle.

To provide such compensation, the preferred form of the control circuit 14 is substantially as shown in FIG. 6, including modulator 46 and a voltage sensitive nonlinear variable impedance circuit 47. The modulator 46 comprises a field effect transistor 48 having a source 49, a gate 50, and a drain 51. The source 49 is connected to B+ while the gate 50 is connected by a coupling capacitor 52 to the output of the pulse generator 42 and by a resistor 53 to an output 54 of the photomultiplier 35. The drain 51 is connected to a voltage divider 55 comprising two resistors 56 and 57 having a junction 58 connected to a base 59 of a transistor $Q_1$.

The variable impedance circuit 47 comprises a series circuit including a variable resistor or potentiometer 60 and a diode 61. The series circuit is connected between the output 54 of the photomultiplier and a reference ground 62 to which the resistor 57 of the voltage divider 55 and an emitter resistor 63 of the transistor $Q_1$ are also connected. The diode 61 is poled for current flow from the reference ground to the output terminal 54.

In addition to the foregoing, the control circuit 14 includes a transformer 64 having a primary winding 65 and a secondary winding 66. The primary winding is connected between B+ and a collector 67 of the transistor $Q_1$, while the secondary winding 66 has its terminals 68 and 69 connected to the input of the amplifier 45 and a center tap 70 connected to a voltage divider including resistors 71 and 72 connected to B+ and the reference ground.

In operation, the photomultiplier 35 generates negative voltage signal relative to the reference ground 62 of increasing magnitude with the intensity of the reflected light beam 13. Thus, the higher the intensity of the light beam or the whiter the image at the focal point 39, the more negative the voltage generated by the photomultiplier. Because of the diode 61, the circuit 47 possesses a nonlinear impedance characteristic. As the magnitude of the negative voltage signal increases, the impedance of the circuit 47 decreases — the diode 61 becoming more and more conductive. As the impedance of the circuit 47 decreases, current flows from the reference ground to the output 54 of the photomultiplier thereby reducing the magnitude of negative voltage applied to the gate 50 of the transistor 48. By proper adjustment of the potentiometer 60, the impedance characteristic of the circuit 47 may be selected to produce a reflected light voltage signal characteristic that is substantially an inverse of the burn characteristic of the electrosensitive blank 15, as previously described.

The voltage signal thus modified by the circuit 47 and applied to the gate 50 of the transistor 48 modulates with the train of pulses generated by the pulse generator 42. In effect, the pulses switch the transistor 48 on and off and are amplitude modulated by the modified voltage signal. The resulting signal at the drain 51 of the transistor 48 is an amplitude modulated pulse train compensated for the nonlinear burn characteristic of the electrosensitive blank. By operation of transistor $Q_1$ an amplified modulated pulse train is developed in the primary winding 65 of the transformer 64 and coupled to the secondary winding 66 for transmission to the amplifier 45. After amplification by the amplifier, the modified amplitude modulated pulse train is applied to the stylus 17 to produce a controlled burning of the upper masking layer of the electrosensitive blank 15 and a facsimile image 16 nearly matching in shade all detail of the original image 11.

While a particular facsimile recorder has been described in detail herein, changes and modifications may be made without departing from the spirit of the invention. Accordingly, it is intended that the present invention be limited in scope only by the terms of the following claims.

We claim:

1. A facsimile recorder comprising:

photoscanning means for scanning an image on a reference document and generating an electrical signal which varies with changes in intensity of a light beam reflected from said document;

an electrosensitive blank including an upper masking layer for burning away to expose a contrasting lower layer at points where electrical pulses are applied to said upper layer;

stylus means for scanning said blank in synchronism with said photoscanning means and for applying electrical pulses to said upper layer to burn dots therein of sizes varying with the magnitude of said applied electrical pulses, said blank having a nonlinear applied electrical pulse dot-size burn characteristic;

pulse generator means for generating a train of uniform electrical pulses; and control circuit means connected to said photoscanning means, pulse generator means, and stylus means for modifying said electrical signal over a range of reflected light intensities to compensate for said nonlinear burn characteristic and for mixing said modified electrical signal and said train of pulses to produce a series of amplitude modulated pulses at said stylus for burning dots in said upper layer having sizes which vary linearly with changes in the intensity of said reflected light beam, said control circuit means including modulator means having an input connected to said pulse generator means, and electrical signal sensitive variable impedance means connected to an output of said photoscanning means and to said input of said modulator means for presenting a variable impedance to said input to develop thereat said modified electrical signal having a magnitude which varies with the intensity of said reflected light beam as an inverse of said burn characteristic.

2. The facsimile recorder of claim 1 wherein:

said photoscanning means generates a voltage having an amplitude which varies directly with changes in the intensity of said reflected light beam; and said variable impedance means includes a diode and a resistor in series between said input of said modulator and a reference ground, said diode being poled to pass current from said reference ground to said input.

* * * * *